US012755953B2

(12) United States Patent
Green et al.

(10) Patent No.: US 12,755,953 B2
(45) Date of Patent: Oct. 6, 2026

(54) MASS SPECTRAL ENCODING

(71) Applicant: Micromass UK Limited, Wilmslow (GB)

(72) Inventors: Martin Raymond Green, Bowdon (GB); Keith George Richardson, High Peak (GB)

(73) Assignee: Micromass UK Limited, Wilmslow (GB)

( * ) Notice: Subject to any disclaimer, the term of this patent is extended or adjusted under 35 U.S.C. 154(b) by 792 days.

(21) Appl. No.: 17/995,330

(22) PCT Filed: Mar. 29, 2021

(86) PCT No.: PCT/GB2021/050778
§ 371 (c)(1),
(2) Date: Oct. 3, 2022

(87) PCT Pub. No.: WO2021/198670
PCT Pub. Date: Oct. 7, 2021

(65) Prior Publication Data

US 2023/0154738 A1 May 18, 2023

(30) Foreign Application Priority Data

Apr. 3, 2020 (GB) ...................................... 2004980

(51) Int. Cl.
*H01J 49/06* (2006.01)
*H01J 49/00* (2006.01)
*H01J 49/42* (2006.01)

(52) U.S. Cl.
CPC ........ *H01J 49/063* (2013.01); *H01J 49/0045* (2013.01); *H01J 49/4215* (2013.01)

(58) Field of Classification Search
CPC ... H01J 49/063; H01J 49/0045; H01J 49/4215
See application file for complete search history.

(56) References Cited

U.S. PATENT DOCUMENTS

| | | | |
|---|---|---|---|
| 10,403,485 | B2 | 9/2019 | Giles et al. |
| 2016/0225593 | A1 | 8/2016 | Hager et al. |
| 2020/0066501 | A1 | 2/2020 | Giles et al. |

FOREIGN PATENT DOCUMENTS

| | | | |
|---|---|---|---|
| EP | 2924712 | A1 | 9/2015 |
| WO | 2017079193 | A1 | 5/2017 |
| WO | 2019102798 | A1 | 5/2019 |

OTHER PUBLICATIONS

Search Report for GB Application No. GB2004980.5, mailed Oct. 5, 2020.

(Continued)

*Primary Examiner* — Georgia Y Epps
*Assistant Examiner* — Hanway Chang
(74) *Attorney, Agent, or Firm* — Goodwin Procter LLP

(57) ABSTRACT

A method of mass spectrometry is disclosed in which one or more AC excitation voltage waveforms are applied to electrodes of an ion guide to radially excite and thereby attenuate ions having mass to charge ratios within respective mass to charge ratio windows. The AC excitation voltage waveforms are varied with time such that ions having different mass to charge ratios are attenuated with different attenuation time profiles. Plural AC excitation voltage waveforms may be varied with time to provide unique mass to charge ratio encoding.

18 Claims, 8 Drawing Sheets

(56) References Cited

OTHER PUBLICATIONS

International Search Report and Written Opinion for International Application No. PCT/GB2021/050778, mailed Jun. 25, 2021.
Combined Search and Examination Report for GB Application No. GB2104440.9, mailed Sep. 6, 2021.

MASS SPECTRAL ENCODING

CROSS-REFERENCE TO RELATED APPLICATIONS

This application is a U.S. national phase filing claiming the benefit of and priority to International Patent Application No. PCT/GB2021/050778, filed Mar. 29, 2021, which claims priority from and the benefit of United Kingdom patent application No. 2004980.5 filed on Apr. 3, 2020, the entire content of which are incorporated herein by reference.

FIELD OF THE INVENTION

The present invention relates to methods of mass spectrometry and to mass spectrometers.

BACKGROUND

Data Independent Acquisition (DIA) mass spectrometry workflows have become increasingly popular as an alternative to Data Dependent Acquisitions (DDA) or targeted experiments, owing to the comprehensive and relatively unbiased nature of the data they can produce.

For example, "MSE" is a DIA approach in which a sample may be subjected to liquid chromatography (LC) separation, before being ionised to produce precursor ions. The LC separated precursor ions are then passed to a fragmentation device that is operated in alternating low and high fragmentation modes. Precursor ions are substantially not fragmented in the low fragmentation mode and are subsequently passed to a mass analyser for mass analysis, whereas precursor ions are fragmented in the high fragmentation mode and the resulting fragment ions are subsequently passed to the mass analyser for mass analysis. A fragment ion detected in the high fragmentation mode can then be associated with a precursor ion detected in the low fragmentation mode based on their detected intensity profiles. For example, the variation in intensity of a precursor ion with time (in the low fragmentation mode) may correspond to the variation in intensity of its fragment or product ions with time (in a high fragmentation mode).

However, this technique is typically only able to provide a limited degree of confidence that precursor ions are correctly associated with their related fragment ions, particularly in the case of complex samples.

Various DIA approaches that can achieve an improved degree of specificity have been proposed. However, such techniques can often suffer from a relatively low degree of sensitivity.

SUMMARY

According to an aspect, there is provided a method of mass spectrometry comprising:

applying a first AC voltage waveform to electrodes of an ion guide so as to radially confine ions within the ion guide;

applying one or more AC excitation voltage waveforms to electrodes of the ion guide, wherein each of the one or more AC excitation voltage waveforms is configured to radially excite and thereby attenuate ions having a mass to charge ratio within a respective mass to charge ratio window as those ions pass through the ion guide; and varying the one or more AC excitation voltage waveforms with time as the ions pass through the ion guide such that ions having different mass to charge ratios are attenuated with different attenuation time profiles.

The present invention provides a method of mass spectrometry in which ions are passed into an ion guide, with one or more AC excitation voltage waveforms being (simultaneously) applied to the ion guide such that ions having mass to charge ratios that fall within one or more corresponding mass to charge ratio attenuation windows are attenuated. Other ions having mass to charge ratio values that fall outside of the one or more mass to charge ratio attenuation windows may be substantially unattenuated by the one or more excitation voltage waveforms, and so may be transmitted by the ion guide.

Thus, each of the one or more AC excitation voltage waveforms causes the ion guide to act as a mass to charge ratio notch filter. Each of the one or more excitation voltage waveforms is varied with time, such that the corresponding mass to charge ratio attenuation window, or "notch", varies with time.

This time variation has the effect that ions are transmitted by the ion guide with intensity profiles that include a detectable pattern of one or more dips in the signal, each dip corresponding to a respective one of the one or more mass to charge ratio attenuation windows (notches). Moreover, and as will discussed in more detail below, the time variation in the one or more AC excitation voltage waveforms is such that this "notch pattern" is different for ions having different mass to charge ratios.

Thus, precursor ions having different mass to charge ratios are encoded with different attenuation time profiles by the application of one or more time varying AC excitation voltage waveforms. These attenuation time profiles can be detected in precursor and fragment ion signals. Precursor ions can then be associated with fragment ions on the basis of the detected attenuation time profiles.

This allows precursor ions and fragment ions to be associated with each other with a high degree of confidence, while only requiring a relatively small fraction of the ions to be attenuated at any particular time for encoding purposes. This means that embodiments of the present invention can provide a Data Independent Acquisition (DIA) mass spectrometry workflow that can achieve a high degree of both specificity and sensitivity.

For the avoidance of doubt, the term attenuation time profile as used herein may mean how the intensity profile of an ion varies with time due to the one or more AC excitation voltage waveforms (one or more notches). According to the present invention, ions having different mass to charge ratios will have intensity profiles as a function of time that are attenuated by the one or more AC excitation voltage waveforms (one or more notches) at different times.

Attenuating ions having different mass to charge ratio values with different attenuation time profiles may comprise encoding ions having different mass to charge ratio values with different attenuation time profiles. Each attenuation time profile may comprise one or more dips in ion signal, each dip in signal being caused by the attenuation caused by one of the AC excitation voltage waveforms applied to the ion guide.

The attenuation caused by any one of the AC excitation voltage waveforms may be such that some or all of the ions that pass into the ion guide that have mass to charge ratios within the corresponding mass to charge ratio window are not transmitted by the ion guide.

Ions may be radially confined within the ion guide (that is, confined perpendicular to the direction of ion transmission) as a result of the application of only the first AC voltage waveform, or as a result of the application of the first AC waveform in combination with one or more other voltages to electrodes of the ion guide. For example, the first AC voltage waveform may cause ions to be confined in a first direction perpendicular to the direction of ion transition, and a second, for example DC, voltage may be applied to electrodes of the ion guide so as to confine the ions in a second direction perpendicular the first direction and to the direction of ion transmission.

The one or more AC excitation voltage waveforms may comprise one or more AC quadrupolar excitation voltage waveforms and/or one or more AC dipolar excitation voltage waveforms.

Applying one or more AC excitation voltage waveforms may comprise simultaneously applying two or more AC excitation voltage waveforms to the electrodes of the ion guide. Correspondingly, varying the one or more AC excitation voltage waveforms with time may comprise simultaneously varying each of the two or more AC excitation voltage waveforms with time.

The method may comprise periodically varying (simultaneously) each of the two or more AC excitation voltage waveforms with a time period T such that during each time period T the corresponding mass to charge ratio windows each scan or step continuously or discontinuously across the same mass to charge ratio range.

The method may comprise periodically varying (simultaneously) each of the two or more AC excitation voltage waveforms with a time period T such that the set of mass to charge ratio positions of the corresponding mass to charge ratio windows at any one time during the time period T is different to the set of mass to charge ratio positions of those mass to charge ratio windows at any other time during the time period T; and/or wherein the AC excitation voltage waveforms are (each) periodically varied (simultaneously) with a time period T such that ions of each mass to charge ratio within a (the) mass to charge ratio range passing through the ion guide are attenuated (and thus encoded) with a unique attenuation time profile.

According to an aspect, there is provided a method of mass spectrometry comprising:

applying a first AC voltage waveform to electrodes of an ion guide so as to radially confine ions within the ion guide;

simultaneously applying two or more AC excitation voltage waveforms to electrodes of the ion guide, wherein each of the two or more AC excitation voltage waveforms is configured to radially excite and thereby attenuate ions having a mass to charge ratio within a respective mass to charge ratio window as those ions pass through the ion guide; and varying the two or more AC excitation voltage waveforms with time as the ions pass through the ion guide such that ions of each mass to charge ratio within a mass to charge ratio range are encoded with a unique attenuation time profile.

These aspects can, and in various embodiments do, include one or more, or all, of the optional features described herein. For example, each of the two or more AC excitation voltage waveforms may be varied (simultaneously) with a time period T such that during each time period T the corresponding mass to charge ratio windows each scan (or step) continuously or discontinuously across the (entire) mass to charge ratio range.

As will be discussed in more detail below, the inventors have recognised that simultaneously applying plural excitation waveforms can provide increased specificity as compared to applying only a single excitation waveform. Moreover, varying the plural excitation voltage waveforms to provide unique mass to charge ratio encoding can further improve specificity.

The method may comprise periodically varying each of the one or more (such as two or more) AC excitation voltage waveforms with a time period T such that the set of times that an ion having a first mass to charge ratio within a (the) mass to charge ratio range experiences attenuation due to the one or more (such as two or more) AC excitation voltage waveforms during the time period T is different to the set of times that ions having other mass to charge ratios within the mass to charge ratio range experience attenuation due to the one or more (such as two or more) AC excitation voltage waveforms during the time period T.

The mass to charge ratio position of each mass to charge ratio window may be varied as a function of time such that the difference in mass to charge ratio position between different windows is substantially constant during said time period T.

This may cause the mass to charge ratio positions of the different windows to be scanned/stepped with time along scanned/stepped lines that are substantially parallel with each other.

The mass to charge ratio positions of different windows may be varied as a function of time such that the difference in mass to charge ratio position between different windows varies during said time period T.

This may cause the mass to charge ratio positions of the different windows to be scanned/stepped with time along scanned/stepped lines that are non-parallel with each other.

The different windows may start the time period Tat different mass to charge ratio positions, or less preferably at the same mass to charge ratio position.

Varying the one or more AC excitation voltage waveforms with time may comprise varying the frequency, or both the frequency and the amplitude of at least one of the one or more AC excitation waveforms with time. For example, both the frequency and amplitude of each of the one or more AC excitation waveforms may be varied with time.

Varying both the frequency and amplitude of at least one of the one or more AC excitation waveforms with time may comprise varying the frequency of the at least one AC excitation voltage waveform linearly with time, and varying the at least one AC excitation voltage waveform substantially according to:

$$V(t) = (A - Bt) * \frac{\sin(C\omega t)}{1 + Dt},$$

where t is time, ω is the frequency of the at least one AC excitation voltage waveform, and A, B, C and D are constants.

The method may comprise varying the one or more AC excitation voltage waveforms with time such that ions are attenuated (and thus encoded) with a first set of attenuation time profiles during a first time period $T_1$, and ions are attenuated (and thus encoded) with a second different set of attenuation time profiles during a second different time period $T_2$.

The method may comprise changing from the first set of attenuation time profiles to the second different set of attenuation time profiles in a predetermined sequence, and/or in response to detecting one or more ions of interest.

The ion guide may be a multipole ion guide, such as a quadrupole. The first AC voltage waveform may comprise a first AC quadrupolar waveform. The method may comprise applying two or more AC excitation voltage waveforms to electrodes of the ion guide by applying at least one AC dipolar excitation waveform to one pair of opposing electrodes of the ion guide, and simultaneously applying at least one other AC dipolar excitation waveform to another pair of opposing electrodes of the ion guide.

The method may comprise varying the one or more AC excitation voltage waveforms with time such that each of the corresponding mass to charge ratio windows varies within a mass to charge ratio range. The method may comprise applying a DC voltage to electrodes of the ion guide, wherein the DC voltage is such that all ions outside of the mass to charge ratio range are attenuated by the ion guide.

The attenuation may be such that some or all of the ions that pass into the ion guide that have mass to charge ratios outside of the mass to charge ratio range are not transmitted by the ion guide.

The one or more (such as two or more) AC excitation voltage waveforms may be configured to encode ions having mass to charge ratios within a (the) mass to charge ratio range. The one or more (such as two or more) AC excitation voltage waveforms may be configured to (together) attenuate (different ions having mass to charge ratios within) 10% to 90%, 20% to 80%, 30% to 70%, 40% to 60%, 45% to 55%, or approximately 50% of the mass to charge ratio range at any one time (during a (the) time period T).

The method may comprise separating ions, or separating analyte and then ionising the analyte to provide separated ions, and then passing the separated ions into the ion guide. The ions that are passed into the quadrupole device may be separated according to a physico-chemical property, such as chromatographic retention time.

The method may comprise performing a first mode of operation comprising fragmenting or reacting precursor ions transmitted by the ion guide to form fragment or product ions, and mass analysing the fragment or product ions to produce first mass spectral data. The method may comprise performing a second mode of operation comprising mass analysing precursor ions transmitted by the ion guide to produce second mass spectral data. The method may comprise processing the first and/or second mass spectral data to detect attenuation time profiles in the first and/or second mass spectral data, and optionally to associate fragment or products ions in the first mass spectral data with precursor ions in the second mass spectral data based on their detected attenuation time profiles matching.

The method may comprise repeatedly alternating between the first mode of operation and the second mode of operation. The method may comprise repeatedly alternating between the first mode of operation and the second mode of operation during a single experimental run or separation cycle of an upstream separation device, such as an LC separation device.

Processing the first and second mass spectral data may comprise associating fragment or products ions in the first mass spectral data with precursor ions in the second mass spectral data based on the detected attenuation time profiles and the times of detection of the ions.

The association may be based on the detected attenuation time profiles and chromatographic separation profiles.

Processing the first and/or second mass spectral data may comprise at least one of: a) using a deconvolution method; b) using an iterative least-squares method; c) using a forward modelling method; d) transforming data to produce transformed data, and processing the transformed data; e) smoothing and/or filtering data to produce smoothed and/or filtered data, and processing the smoothed and/or filtered data; f) detecting peaks in the first and/or second mass spectral data; g) processing data corresponding to only a subset of the first and/or second mass spectral data; and h) normalising data.

The method may comprise normalising the first and/or or second mass spectral data. The normalisation may reduce or remove intensity variation effects arising from the application of the one or more AC excitation voltage waveforms.

According to another aspect, there is provided a mass spectrometer comprising:

an ion guide;

at least one voltage supply configured to apply a first AC voltage waveform to electrodes of the ion guide so as to radially confine ions within the ion guide, and to apply one or more AC excitation voltage waveforms to electrodes of the ion guide, wherein each of the one or more AC excitation voltage waveforms is configured to radially excite and thereby attenuate ions having a mass to charge ratio within a respective mass to charge ratio window as those ions pass through the ion guide; and a control circuit configured to vary the one or more AC excitation voltage waveforms with time as ions pass through the ion guide such that ions having different mass to charge ratios are attenuated with different attenuation time profiles.

The mass spectrometer may be configured so as to perform any of the methods described herein.

Thus, the at least one voltage supply may be configured to apply voltages to electrodes of the ion guide according to any of the methods described herein. Similarly, the control circuit may be configured to vary the one or more AC excitation voltage waveforms according to any of the methods described herein. Similarly, the at least one processor may be configured process mass spectral data according to any of the methods described herein.

The mass spectrometer may further comprise a device configured to separate ions, or to separate analyte and then ionise the analyte to provide separated ions, and then to pass the separated ions into the ion guide. The device may comprise a chromatographic separation device.

According to another aspect, there is provided a mass spectrometer comprising:

an ion guide;

at least one voltage supply configured to apply a first AC voltage waveform to electrodes of the ion guide so as to radially confine ions within the ion guide, and to simultaneously apply two or more AC excitation voltage waveforms to electrodes of the ion guide, wherein each of the two or more AC excitation voltage waveforms is configured to radially excite and thereby attenuate ions having a mass to charge ratio within a respective mass to charge ratio window as those ions pass through the ion guide; and a control circuit configured to vary the two or more AC excitation voltage waveforms with time as ions pass through the ion guide such that ions of each mass to charge ratio within a mass to charge ratio range are encoded with a unique attenuation time profile.

These aspects can, and in various embodiments do, include one or more, or all, of the optional features described herein.

According to an embodiment, there is provided a method of mass spectrometry comprising: generating parent ions and transmitting the parent ions through an RF quadrupole ion guide; applying and progressively scanning the frequency of one or more dipolar excitation waveforms with respect to time such that the transmission of parent ions is varied as a function of mass to charge ratio and time; mass analysing at multiple time points in the excitation frequency scan and assigning product ions to precursor ions, formed down-stream of the ion guide, based on the correlation between the intensity profile of precursor and product ions as a function of time; and repeating the frequency scan at regular intervals to produce multiple sets of encoded data with respect to time.

Waveforms comprising one or more different frequency scans may be simultaneously applied to both rod pairs to minimize constructive and destructive interference.

Additionally or alternatively, multiple frequency scans may be arranged such that simultaneous attenuation of a given set of mass to charge ratio ranges occurs only once during the entire scan cycle.

Additionally or alternatively, the amplitude of the waveform may be varied progressively or discontinuously during the frequency scan.

Additionally or alternatively, the scan parameters may be changed between different sets of encoded data in a predetermined sequence or in a data dependent manner.

The method may comprise processing the data by at least one of:

a) a linear deconvolution method, such as Tikhonov regularized least squares, truncated singular value decomposition or Wiener deconvolution;
b) an iterative constrained least-squares approach, such as non-negative least squares, Richardson-Lucy deconvolution or modified residual norm steepest descent;
c) a Bayesian forward modelling approach, such as Maximum Entropy deconvolution, Markov Chain Monte Carlo or nested sampling;
d) Maximum Entropy deconvolution;
e) a step comprising subtraction of data containing mass to charge ratio regions which are attenuated from data containing substantially the same mass to charge ratio regions which are unattenuated;
f) collapsing the data into a single spectrum at each retention time (RT), assigning product ions to precursor ions based on RT alone and then examining the two-dimensional data associated with these assignments to improve the assignment and reduce ambiguity;
g) a step comprising smoothing or filtering the data in the RT dimension prior to deconvolution using a method such as a boxcar smooth, a Savitzky-Golay filter or a Wiener filter;
h) a step comprising applying a mass spectral peak detection algorithm prior to deconvolution;
i) a step comprising applying deconvolution to a restricted subset of the data corresponding to a target mass list or to masses identified in a peak detection step.

BRIEF DESCRIPTION OF THE DRAWINGS

Various embodiments will now be described, by way of example only, and with reference to the accompanying drawings in which.

DETAILED DESCRIPTION

Figure 1:
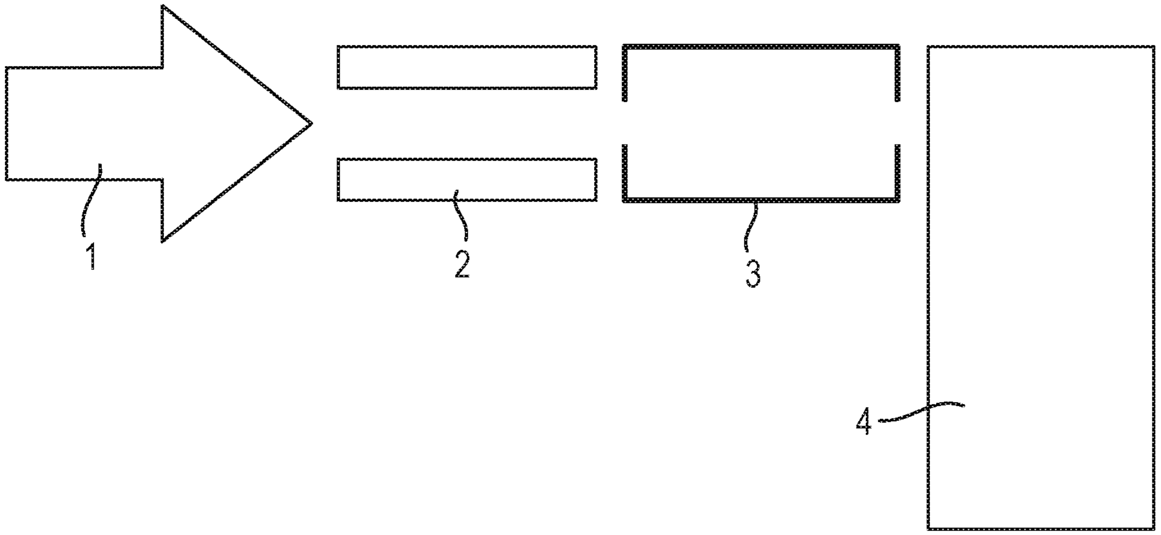
FIG. 1 shows schematically a mass spectrometer which may be operated in accordance with embodiments of the present invention.

FIG. 1 shows schematically a mass spectrometer which may be operated in accordance with embodiments of the present invention. The mass spectrometer may comprise an ion guide 2 upstream of a fragmentation or reaction device 3, and a mass analyser 4 downstream of the fragmentation or reaction device 3. In the present embodiment, the ion guide is a quadrupole rod set device 2, but other ion guide geometries are contemplated, such as other multipole rod sets. Similarly, in the present embodiment, the mass analyser is a Time-of-Flight (ToF) mass analyser 4, but in other embodiments, the mass analyser may be, for example, a quadrupole or other mass analyser. It will be appreciated that the mass spectrometer may include other components not shown in FIG. 1.

Ions 1, which may be produced by an ion source (not shown), may pass into the quadrupole device 2. The ion source can be any suitable device configured to ionise a sample to produce ions 1. In various embodiments, the ion source receives a sample to be ionised from a separation device (not shown), such as a liquid chromatography (LC) separator.

Thus, in various embodiments, the ions 1 passed into the quadrupole device 2 are separated according to a physico-chemical property, such as chromatographic retention time (RT). However, the ions 1 need not be separated, let alone in this manner.

Figure 2:
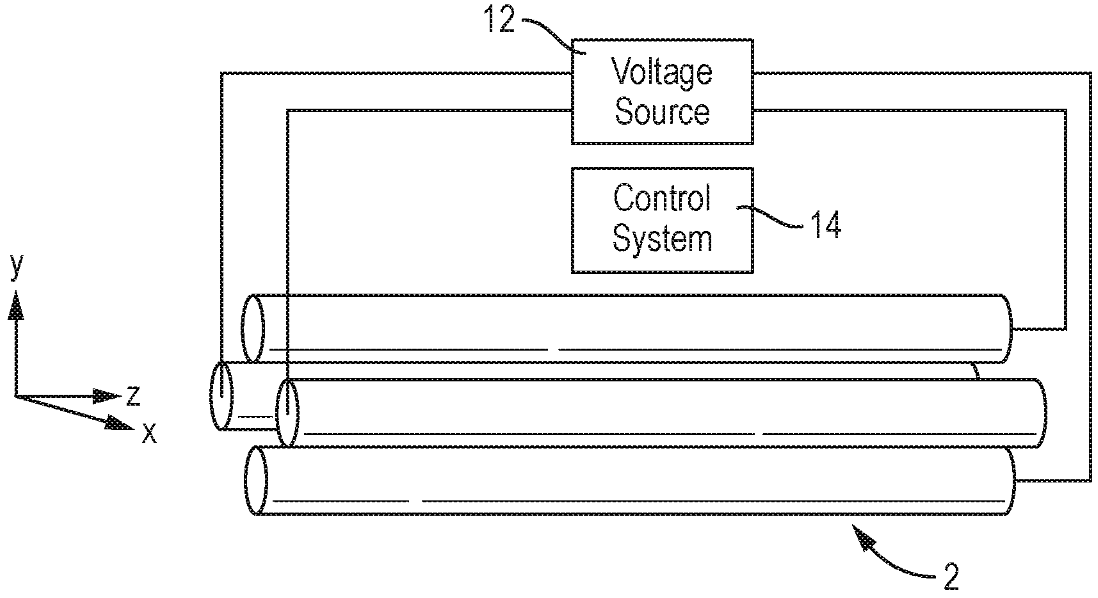
FIG. 2 shows schematically a quadrupole mass filter in accordance with embodiments of the present invention.

FIG. 2 shows schematically the quadrupole device 2 in more detail. As illustrated in FIG. 2, the quadrupole device 2 may comprise four electrodes, for example rod electrodes, which may be arranged to be parallel to one another, and to surround a central (longitudinal) axis of the quadrupole (z-axis) in a rotationally symmetric manner.

Thus, the quadrupole device 2 (for example, quadrupole mass filter) may comprise a first pair of opposing rod electrodes both placed parallel to the central axis in a first (x-z) plane, and a second pair of opposing rod electrodes both placed parallel to the central axis in a second (y-z) plane perpendicularly intersecting the first (x-z) plane at the central axis.

In various embodiments (in operation) plural different voltages are applied to the electrodes of the quadrupole device 2, for example, by one or more voltage sources 12. As shown in FIG. 2, according to various embodiments, a control system 14 may be provided. The one or more voltage sources 12 may be controlled by the control system 14 and/or may form part of the control system 14. The control system may be configured to control the operation of the quadrupole 2 and/or voltage source(s) 12 and/or other elements of the mass spectrometer, for example, in the manner of the various embodiments described herein. The control system 14 may comprise suitable control circuitry that is configured to cause the quadrupole 2 and/or voltage source (s) 12 and/or other elements of the mass spectrometer to operate in the manner of the various embodiments described herein. The control system 14 may also comprise suitable processing circuitry (a processor) configured to perform any one or more or all of the necessary processing operations in respect of the various embodiments described herein.

The quadrupole device 2 may be operated in an "AC-only" broadband transmission mode of operation, in which a main AC (e.g. RF) quadrupolar voltage waveform is applied to the electrodes of the quadrupole device 2 by the one or more voltage sources 12, such that ions having mass to charge ratios within a (relatively wide) mass to charge ratio transmission window can assume stable trajectories through the quadrupole device 2. Thus, a first phase of a repeating AC quadrupolar voltage waveform may be applied to one pair of opposing electrodes of the quadrupole device 2, and another phase of the repeating AC quadrupolar voltage waveform (e.g. 180° out of phase) may be applied to the other pair of opposing electrodes. The main AC (e.g. RF) quadrupolar voltage waveform may act to radially confine ions within the quadrupole 2.

In addition to the main quadrupolar voltage waveform, one or more (AC or RF) excitation voltage waveforms are also applied (simultaneously) to the electrodes of the quadrupole device 2 by the one or more voltage sources 12 (simultaneously with the main quadrupolar voltage waveform).

According to various embodiments, the one or more excitation voltage waveforms have the effect of radially exciting and hence increasing the radial position of ions having mass to charge ratios that fall within one or more corresponding mass to charge ratio windows ("notches") as those ions traverse the quadrupole device 2, such that at least some of the ions are attenuated. For example, the ions may be attenuated due to hitting the electrodes of the quadrupole device 2, or being ejected radially between or through the electrodes, or being perturbed sufficiently on exiting the quadrupole device 2 that they are unable to be transmitted to or detected by a downstream device.

Thus, each excitation voltage waveform is configured to cause ions having mass to charge ratios within a respective mass to charge ratio window (notch) to be attenuated as those ions pass through the quadrupole device 2. The attenuation may be such that some or all of the ions that pass into the quadrupole device 2 that have mass to charge ratios within a mass to charge ratio attenuation window are not transmitted by the quadrupole device 2, whereas other mass to charge ratios are onwardly transmitted.

It will be appreciated here that the range of mass to charge ratios (width) in each such mass to charge ratio attenuation window ("notch") should be (much) less than the range of mass to charge ratios (width) of the overall mass to charge ratio transmission window of the quadrupole device 2. Thus, for example and in various embodiments, the ratio of the width of a (each) mass to charge ratio attenuation window ("notch") to the width of the mass to charge ratio transmission window of the quadrupole device 2 may be less than 20%, less than 10%, less than 5%, or less than 2%.

The excitation voltage waveform may be quadrupolar in nature or may have other forms. For example, an (or each) excitation voltage waveform may be dipolar. Thus, one or more dipolar (AC or RF) excitation voltage waveforms may be applied (simultaneously) to the electrodes of the quadrupole device 2 by the one or more voltage sources 12 (simultaneously with the main quadrupolar voltage waveform). Thus, for example, a repeating (AC or RF) dipolar voltage waveform may be applied to the quadrupole device 2 by applying a first phase of the repeating (AC or RF) dipolar voltage waveform to one of the electrodes of the quadrupole device 2, and the opposite phase of the repeating (AC or RF) dipolar voltage waveform (180° out of phase) to the opposite electrode of the quadrupole device 2, or by applying the first phase of the repeating (AC or RF) dipolar voltage waveform to one pair of adjacent electrodes of the quadrupole device 2 and the opposite phase of the repeating (AC or RF) dipolar voltage waveform (180° out of phase) to the other pair of adjacent electrodes.

One or more, or each and every, of the one or more (dipolar) excitation voltage waveforms may be varied (under the control of the control system 14) with time, such that the mass to charge ratio range covered by the corresponding mass to charge ratio attenuation window(s) (notch(es)) varies with time. As will be discussed in more detail below, this time variation is such that ions having different mass to charge ratios are attenuated, and thereby encoded, with different attenuation time profiles by the quadrupole device 2. That is, the mass to charge ratio of an ion is encoded as an attenuation time profile.

Thus, as ions 1 pass through the quadrupole device 2, at least some of the ions 1 having mass to charge ratios that fall within one or more time-varying mass to charge ratio attenuation windows (notches) are attenuated, and other ions are transmitted by the quadrupole device 2.

Returning to FIG. 1, ions transmitted (and encoded) by the quadrupole device 2 pass to the fragmentation or reaction device 3, which may be operated in first and second modes of operation.

In the first mode of operation, ions received by the fragmentation or reaction device 3 may be substantially fragmented or reacted by the fragmentation or reaction device 3 to form fragment or product ions. These fragment or product ions may pass to the ToF mass analyser 4 for mass analysis. In the second mode of operation, ions may bypass the fragmentation or reaction device 3 or may be received by the fragmentation or reaction device 3 and substantially not fragmented or reacted by the fragmentation or reaction device 3 (or fragmented or reacted by a substantially lower amount than in the first mode). In the second mode the ions may then pass (e.g. substantially unchanged) to the ToF mass analyser 4 for mass analysis.

The first and second modes of operation may be repeatedly alternated between during a single experimental run or separation cycle of an upstream separation device, such as an LC separation device. Thus, multiple instances of each of the first and second modes of operation may be performed in a single experimental run or separation cycle. Desirably, the modes are alternated between such that each analyte eluting from the separation device is subjected to both modes one or more times.

The fragmentation or reaction device 3 can be any device capable of operating in this manner. For example, the fragmentation or reaction device 3 may be a collision cell (e.g. Collision Induced Dissociation cell), with a collision energy of the collision cell being high enough to cause fragmentation in the first mode of operation, and low enough to cause substantially no fragmentation (or substantially less fragmentation) in the second mode of operation. However, other types of fragmentation device are contemplated, such as Electron Transfer Dissociation or Electron Capture Dissociation devices. Alternatively, the fragmentation or reaction device 3 may be a device which can react precursor ions with reagent ions or reagent molecules so as to produce product ions.

Ions emerging from (or bypassing) the fragmentation or reaction device 3 may pass to the ToF mass analyser 4 for mass analysis. The ToF mass analyser 4 may acquire multiple consecutive mass spectra for ions emerging from (or bypassing) the fragmentation or reaction device 3. Thus, the ToF mass analyser 4 may acquire a multi-dimensional mass spectral dataset that indicates ion intensity as a function of both mass to charge ratio and time. The mass spectral dataset may further include other dimensions, such as retention time (RT) from the upstream separator (e.g. LC separator).

As will also be discussed in more detail below, the acquired mass spectral dataset may be processed (for example, by a processor of the control system 14) to associate fragment or product ions from the first mode of operation with precursor ions from the second mode of operation on the basis of attenuation time profiles (patterns) encoded by the quadrupole device 2.

As discussed herein, encoding the mass to charge ratios of precursor ions as a pattern of attenuation can allow precursor ions and fragment ions to be associated with each other with a high degree of confidence, while only requiring a relatively small fraction of the precursor ions to be attenuated for encoding purposes. This means that embodiments of the present invention can, for example, provide a Data Independent Acquisition (DIA) mass spectrometry workflow that can achieve a high degree of both specificity and sensitivity.

FIGS. 3A-3G illustrate data for an example in which a sample was separated according to chromatographic retention time (RT) using reverse-phase micro flow liquid chromatography (LC), and the resulting LC elution profile analysed. The sample comprises a protein mixture comprising a relatively close equimolar ratio of tryptically digested proteins: Yeast Enolase, Phosphorylase b, Yeast Alcohol Dehydrogenase (ADH) and Bovine Serum Albumin (BSA).

Figure 3A:
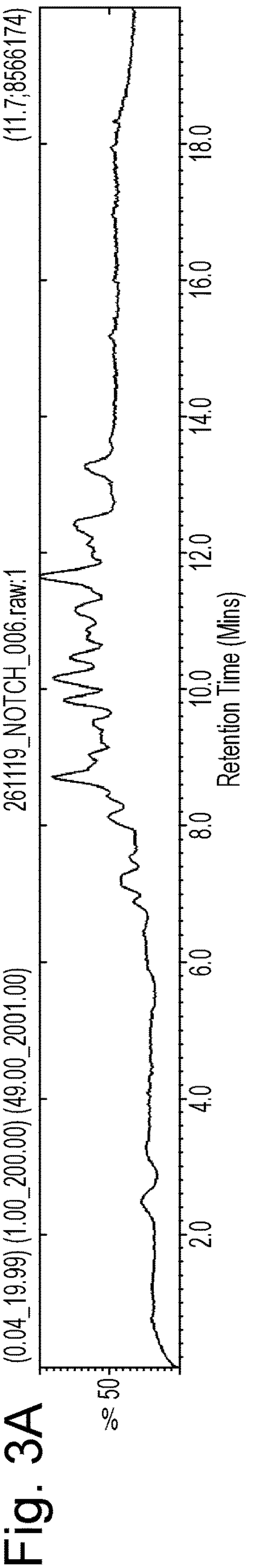
FIGS. 3A, 3B, 3C, 3D, 3E, 3F and 3G each show a plot of data obtained by analysing a sample in accordance with an embodiment.

FIG. 3A shows the total ion current as a function of LC retention time. In other words, the retention time separated sample was ionised, and the resulting ions were passed into the quadrupole device 2. The quadrupole device 2 was operated to encode ions passing through the quadrupole device 2 during each of plural repeating encoding cycles, each cycle lasting a time period of T=0.5 s. During each encoding cycle, five time varying dipolar excitation waveforms were applied simultaneously to the quadrupole device 2 so as to scan five respective attenuation notches across mass to charge ratio. This serves to encode the mass to charge ratios of the ions into the resulting ion signal, as will be described further below. Encoding cycles of the quadrupole device 2 were synchronised with the repeatedly alternating high and low fragmentation modes of the collision cell 3, such that the start and end of any given instance of one of the fragmentation modes substantially coincides with the start and end of an encoding cycle, respectively. That is, ions encoded during a first encoding cycle of the quadrupole device 2 were subjected to only the high fragmentation mode of the collision cell 3, and ions encoded during the next encoding cycle of the quadrupole device 2 were only subjected to the low fragmentation mode of the collision cell 3, and so on. Thus, each instance of the high collision energy mode, and each instance of the low collision energy mode, was performed for the time period of T=0.5 s.

The ToF mass analyser 4 acquired mass spectra for ions emerging from the collision cell 3 at a rate of 400 Hz, such that a total of 200 individual mass spectra were acquired by the ToF mass analyser 4 for each mode instance (i.e. during each T=0.5 s). However, other acquisition rates may be used.

Figure 3B:
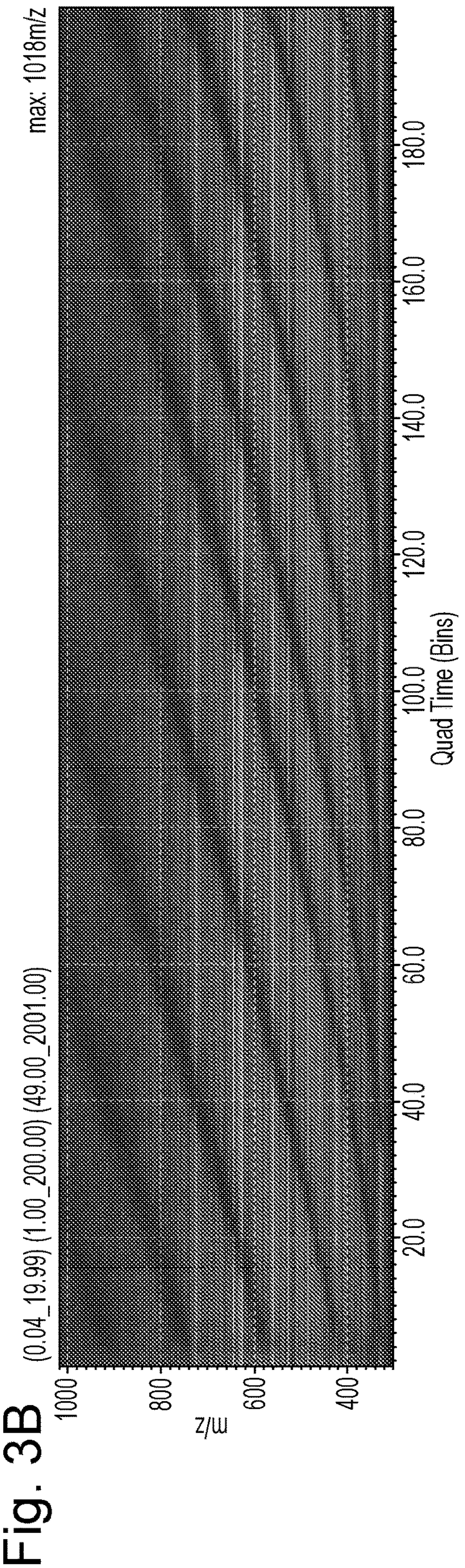

FIG. 3B shows a two-dimensional dataset formed by summing the data from each instance of the low energy (non-fragmenting) mode. In this plot, the x-axis corresponds to the number in the sequence of acquired spectra (that is, corresponding to time), and the y-axis corresponds to mass to charge ratio detected by the ToF mass analyser 4. The intensity of ions detected (ion current) is indicated by shading, with darker shading indicating a lower detected ion intensity, and brighter shading indicating a higher detected ion intensity.

Figure 3C:
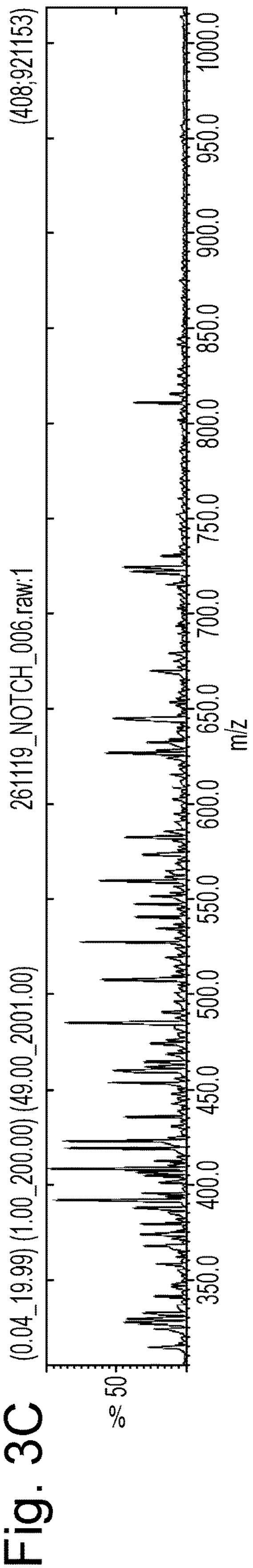

FIG. 3C shows an overall mass spectrum of signal intensity as a function of ToF mass to charge ratio, obtained by combining the data of FIG. 3B into a single plot.

Only a single excitation voltage waveform may be applied to the quadrupole device 2 at any one time, or plural different excitation voltage waveforms may be applied simultaneously to the quadrupole device 2.

In the example of FIG. 3, five time varying dipolar excitation waveforms were applied simultaneously to the quadrupole device 2 as the ions passed through the quadrupole 2. Accordingly, five dark regions are apparent at any given time in FIG. 3B, which each corresponding to the attenuation caused by one of the time varying dipolar excitation voltage waveforms.

The inventors have recognised that increasing the number of simultaneously applied excitation voltage waveforms can increase signal to noise ratio of the attenuation encoding pattern, and thus increase the confidence with which precursor and fragment ions can be associated with each other (that is, increase specificity). However, this may result in a greater fraction of ions being attenuated, and thus decreased sensitivity. Accordingly, it may be desirable to limit the total attenuation. Thus, the one or more excitation voltage waveforms may be configured such that the total ion signal attenuation caused by their application (at any one time) is less than 50%, less than 40%, less than 30%, less than 20% or less than 10%. However, a total ion signal attenuation of 50% or greater is possible.

The one or more excitation voltage waveforms may be configured to together attenuate 10% to 90%, such as 20% to 80%, such as 30% to 70%, such as 40% to 60%, such as 45% to 55%, or approximately 50% of the overall mass to charge ratio range at any one time during the time period T. The duty cycle may thus be approximately 50%. The inventors have found that attenuating around 50% of the ions for encoding purposes can provide an optimum balance between specificity and sensitivity.

The excitation voltage waveform can be varied with time in any suitable way which causes a time variation in the corresponding mass to charge ratio attenuation window (notch). For example, the frequency of an excitation voltage waveform may be varied in time, causing a corresponding variation in the mass to charge ratio position of the corresponding notch. For example, increasing the frequency of an excitation voltage waveform may cause the mass to charge ratio position of the corresponding notch to decrease (and vice versa). The frequency may be varied continuously and progressively or discontinuously (e.g. stepped) in time such that the mass to charge ratio position of the corresponding notch varies continuously and progressively or discontinuously (e.g. stepped) in time.

Additionally or alternatively, the amplitude of an excitation voltage waveform may be varied in time, causing a corresponding variation in the mass to charge ratio width of the corresponding notch. For example, increasing the amplitude of an excitation voltage waveform may increase the mass to charge ratio width of the corresponding notch (and vice versa). The amplitude may be varied continuously and progressively or discontinuously (e.g. stepped) in time such that the mass to charge ratio width of the corresponding notch varies continuously and progressively or discontinuously (e.g. stepped) in time. The amplitude variation may include the amplitude varying between substantially zero and a non-zero value, for example, such that the corresponding notch varies between being "ON" and "OFF".

As described above, the frequency of a (dipolar) excitation voltage waveform may be scanned or stepped, e.g. linearly, in time so as to cause the corresponding notch to scan or step across mass to charge ratio in time. For example, the frequency may be scanned so as to increase or decrease linearly in time. However, the inventors have recognised that the relationship between excitation waveform frequency and notch mass to charge ratio position is non-linear in nature and that this may present certain difficulties. Thus, linearly scanning or stepping the frequency in time will typically cause the corresponding notch to scan or step across mass to charge ratio in a non-linear manner. Where plural such scanning excitation waveforms are simultaneously applied in this manner, this may result in the notches being scanned or stepped such that they converge towards each other in the time-m/z multi-dimensional data set during an encoding cycle, which can result in decreased specificity. In other words, the notches may initially be separated from each other in mass to charge ratio by certain amounts, but as time progresses and the notches are scanned or stepped they may converge such that they are separated from each other by smaller amounts or even overlap.

Similarly, the inventors have recognised that the mass to charge ratio width of a notch may tend to increase as excitation waveform frequency decreases and that this may present certain difficulties. For example, scanning or stepping the excitation waveform frequency in time will typically result in the overall amount of signal attenuation caused by the excitation waveform varying with time, which may again may result in decreased specificity.

In embodiments of the invention, the time variation of a (dipolar) excitation voltage waveform may be adapted so as to cause the mass to charge ratio position of the corresponding notch to vary with time in a substantially linear manner. Additionally or alternatively, the time variation of a (dipolar) excitation voltage waveform may be adapted so as to cause the mass to charge ratio width of the corresponding notch to be substantially constant in time.

In particular, the form of a (dipolar) excitation waveform applied to the quadrupole device 2 may be given generally by:

$$V(t) = (A - Bt) * \frac{\sin(C\omega t)}{1 + Dt} \qquad (1)$$

where t is time, $\omega(=2\pi f)$ is the (angular) frequency of the excitation waveform, and A, B, C and D are constants which may be selected to result in suitable and desired waveform characteristics. The inventors have found that this expression can result in an approximately linear relationship between notch mass to charge ratio position and scanning/stepping time, and a relatively constant notch width, when the excitation waveform frequency is scanned/stepped linearly in time.

In particular, the term 1/(1+Dt) may result in a notch scan line being substantially linear with respect to mass to charge ratio as time progresses, and the term (A-Bt) may result in the amplitude of the waveform decreasing with time as frequency decreases, such that notch width remains relatively constant over a scanned/stepped time range.

Each of the five dipolar excitation waveforms applied to the quadrupole device 2 in the example of FIG. 3 were of the form given in equation (1). The frequency, f, of each dipolar excitation waveform was scanned in the range $f_{max}$=342 kHz to $f_{min}$=78.5 kHz, which corresponded to scanning over a mass to charge ratio range of 280 to 1100. Each "scanning notch" completed a complete mass to charge ratio scan during each encoding cycle (lasting T=0.5 s), corresponding to the time during which time 200 mass spectra were acquired.

In FIG. 3B, dark bands are apparent that extend diagonally upwards and to the right. As described above, these dark bands represent the attenuation caused by the five scanned notches, which is why five bands are present at any given time (i.e. at any given point along the x-axis). It can be seen from FIG. 3B that the mass to charge ratios attenuated by any given one of the bands varies substantially linearly with time, and that the range of mass to charge ratios attenuated at any given time (i.e. notch width) remains substantially constant over time. This can allow increased specificity.

It has been recognised that it would be possible to further increase the degree of linearity of the bands and/or further decrease the variation in notch width with time, for example by including higher order terms in equation (1). It is also contemplated that a "scanning notch" which varies in a substantially non-linear and/or non-monotonic manner may be used, if desired.

Where plural excitation waveform notches are scanned/stepped simultaneously, different notches may "overlap" each other during an encoding cycle. Alternatively, where plural scanning excitation waveforms are applied simultaneously to the quadrupole device 2, they may be applied such that their corresponding notches do not overlap each other during each encoding cycle. This may be done by offsetting the scanning/stepping of notches from each other in time. For example, each scanning/stepping excitation waveform may be triggered to begin at a different point in time during an encoding cycle. However, this would result in a period of time at the beginning of an encoding cycle during which some of the excitation waveforms are not being applied, which can again result in reduced specificity.

Accordingly, all of the scanning/stepping excitation waveforms may begin at the start of an encoding cycle, but such that their corresponding notches begin at different mass to charge ratio positions. The mass to charge ratio position of each notch is then scanned/stepped in mass to charge ratio with time. Desirably, the notches are scanned/stepped over a predetermined maximum range of mass to charge ratios. If a notch mass to charge ratio position reaches one extreme of this mass to charge ratio range before the end of the encoding cycle, then the notch position moves discontinuously to the other extreme of the range, and then continues scanning/stepping until the end of the encoding cycle.

For example, as is apparent from FIG. 3B, a first of the dipolar excitation voltage waveforms begins at an initial time $t=T_0$ with the highest frequency, $f_{max}$, (corresponding to the lowest mass to charge ratio) and its frequency is scanned linearly and continuously over the encoding cycle period T to reach the lowest frequency, $f_{min}$, (corresponding to the highest mass to charge ratio) at time $t=T_1=T_0+T$. The frequencies of the other four dipolar excitation voltage waveforms, however, are scanned discontinuously during the same time period, with the frequency variation of these four excitation waveforms being effectively offset in time by a respective offset, $T_{off}$, relative to the first excitation waveform. In other words, the other four excitation voltage waveforms have different frequencies (and hence attenuate different mass to charge ratios) at time $T_0$ and are scanned from those positions.

Thus, an excitation waveform offset by time $T_{off}$ begins at time $t=T_0$ with an initial frequency that is equal to the frequency that the first excitation waveform has at time $t=T_1-T_{off}$. The frequency of the offset excitation waveform then decreases linearly in time (with the same gradient as the first excitation waveform) until it reaches $f_{min}$ at time $t=T_0+T_{off}$, at which time the frequency discontinuously changes to $f_{max}$, and then continues to decrease linearly in time (with the same gradient as the first excitation waveform) until it reaches the initial frequency again at time $t=T_1$. As can be seen in FIG. 3B, this then results in all of the five notches being resolvable (i.e. non-overlapping in mass to charge ratio) at any point in time during an encoding cycle, which can increase specificity.

Thus, the frequency of each (dipolar) excitation voltage waveform may be ramped in time according to a sawtooth pattern, with the phase of the sawtooth being different for each excitation waveform. In the example of FIG. 3, the ramp of this frequency sawtooth is linear, but it would also be possible for the ramp of the frequency sawtooth to be non-linear, if desired.

As discussed above, the time variation of the one or more (dipolar) AC excitation waveforms applied to the quadrupole device 2 has the effect that ions are transmitted by the quadrupole device 2 with intensity time profiles that include a detectable pattern of one or more dips in the ion signal, each dip corresponding to a respective one of the one or more mass to charge ratio attenuation windows (notches) that is attenuating ions. This pattern of signal dips is different for ions having different mass to charge ratios and therefore the mass to charge ratios are encoded into the ion signals by the notches.

Figure 3D:
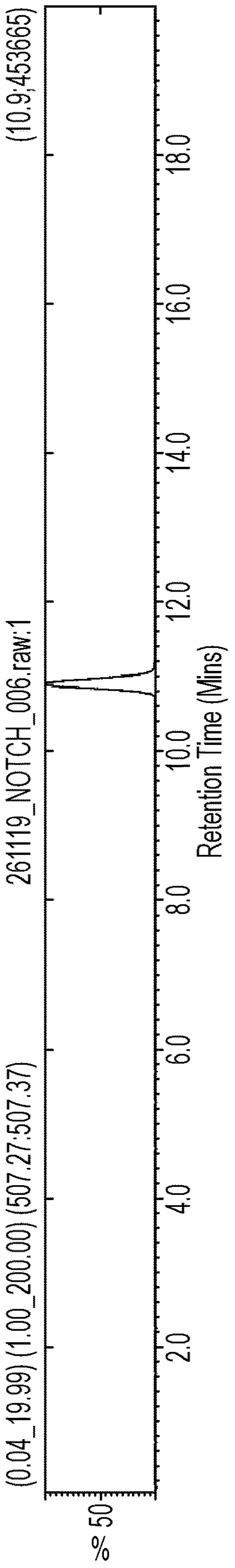
Figure 3E:
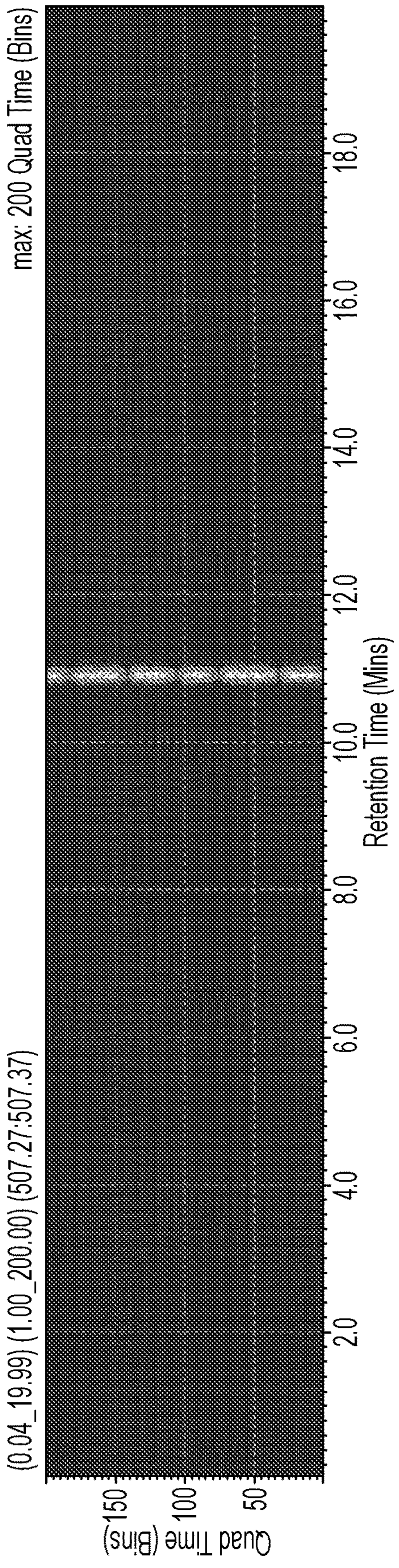
Figure 3F:
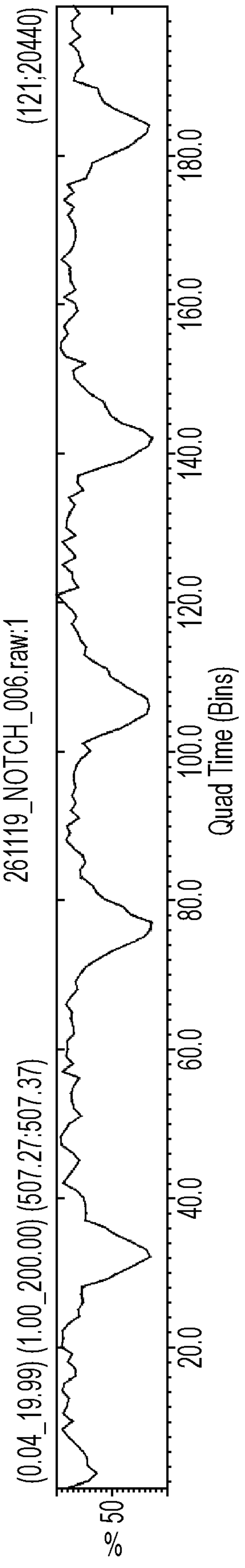
Figure 3G:
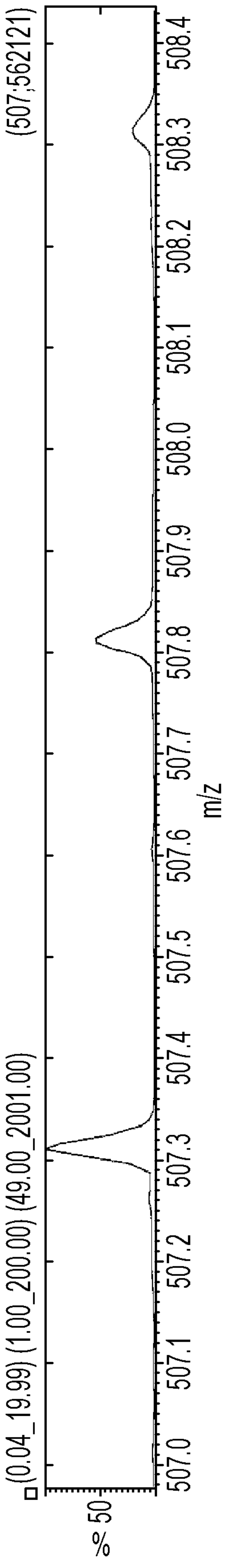

FIGS. 3D-G represent the same data as in FIG. 3A-C, but filtered so as to include only data within the mass to charge ratio range between about 507 and 508.4. As can be seen in FIG. 3G, which represents filtered data corresponding to FIG. 3C, within this range there is a single mass peak at a mass of about 507.3 and two other corresponding isotopic peaks. As can be seen in FIG. 3D, which represents filtered data corresponding to FIG. 3A, these ions eluted from the LC column at substantially the same time.

FIG. 3E shows the ToF mass to charge ratio (y-axis) as a function of LC retention time (x-axis) for the filtered data, i.e. for the eluting peak shown in FIG. 3D. The shading of the data points represents the intensities of the ions, with darker shading representing less intense signals, and lighter shading representing more intense signals. It can be seen that there are five times within the T=0.5 s cycle at which a drop in ion signal occurs for this mass to charge ratio range.

FIG. 3F illustrates the intensity profile of ions transmitted from the quadrupole device 2 as a function of time summed over each T=0.5 s encoding cycle across the chromatographic peak.

As can be seen in FIGS. 3E and 3F, the intensity time profiles of these ions include a pattern five dips in signal, each dip corresponding to a respective one of the five dipolar excitation waveforms (i.e. five notches).

It will be appreciated that the intensity time profiles of other ions having other mass to charge ratios within the scan range (280 to 1100) will include a different pattern of five dips in signal. In particular, the times during the encoding cycle at which the dips appears will differ for ions of different mass to charge ratios, as a result of the dipolar excitation waveforms being scanning across the mass to charge ratio range in time. Thus, the mass to charge ratio is encoded into the ion signal as a pattern of signal dips (attenuation) in the intensity profiles of the ions transmitted by the quadrupole device 2.

As will be described in more detail below, the inventors have recognised that where plural excitation waveforms are scanned simultaneously in the above manner (or stepped), it may be the case that some ions having different mass to charge ratios are attenuated at the same times during an encoding cycle by all of the notches. This means that these different ions may be transmitted by the quadrupole device 2 with the same attenuation time profiles (patterns), such that it may be difficult or impossible to distinguish these ions, or their associated product ions, from each other on this basis. This can reduce specificity.

Figure 4A:
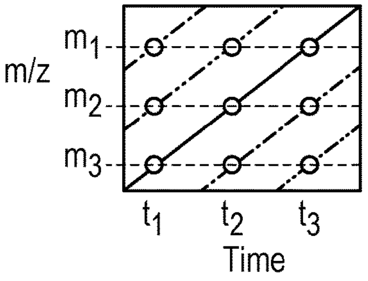
FIGS. 4A, 4B and 4C each show schematically scanning notches according to various embodiments.

For example, FIG. 4A illustrates schematically three notches being scanned simultaneously in the manner substantially as discussed above. In this case, the three notches are scanned with the same scan parameters, except that they are offset from each other in time in the manner discussed above, such that each notch scan is parallel. In this case, the scanning notches are offset from each other in time such that the time offset between each neighbouring pair of scanning notches is the same.

As illustrated in FIG. 4A, this results in some ions having different mass to charge ratios experiencing the same pattern of notch attenuation during the encoding cycle. For example ions having mass to charge ratios $m_1$, $m_2$ and $m_3$ each experience attenuation at times $t_1$, $t_2$ and $t_3$. This means that the intensity time profiles of these ions will include signal dips at the same times during an encoding cycle, thereby making it difficult or impossible to distinguish these ions from each other on that basis.

In order to avoid this, plural excitation voltage waveforms may be simultaneously applied to the quadrupole device 2 such that all different mass to charge ratios (within the range over which the notches are scanned/stepped) are encoded with unique notch attenuation time profiles. This may be achieved by arranging simultaneous scanning (or stepped) notches such that the set of mass to charge ratio positions of the notches at any one time during an encoding cycle is unique (that is, is different to the set of mass to charge ratio positions of the notches at any other time during the encoding cycle).

For example, and in various embodiments, scanning notches may be offset from each other in time and mass to charge ratio, such that the time offset between each neighbouring pair of scanning notches is different to the time offset between each other neighbouring pair of scanning notches. This arrangement is illustrated in FIG. 4B.

Figure 4B:
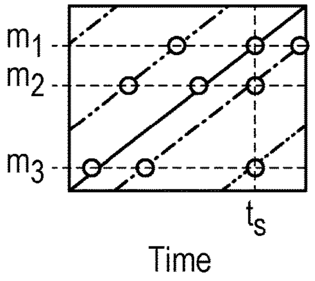

In FIG. 4B, the set of mass to charge ratio positions of the notches at any one time during the encoding cycle is unique. For example, $t_s$ is the only time during the encoding cycle at which masses $m_1$, $m_2$ and $m_3$ experience attenuation at the same time. This arrangement results in the phase of the signal dips caused by the notches being unique for each mass to charge ratio.

In the example of FIG. 3, the time offset values, $T_{off}$, of each of the five excitation waveforms relative to the first waveform were selected to be 0 (for the first waveform), 75 ms, 165 ms, 270 ms and 390 ms, respectively. This results in the time offsets between neighbouring pairs of scanning notches being 75 ms (between the first and second waveforms), 90 ms (between the second and third waveforms), 105 ms (between the third and fourth waveforms), 120 ms (between the fourth and fifth waveforms) and 110 ms (between the fifth and first waveforms). Thus, the time offset between each neighbouring pair of scanning notches is different to the time offset between each other neighbouring pair of scanning notches. In other words, the time offset between any two adjacent notches is unique. This then results in mass to charge ratios within the scan range (280 to 1100) having unique encodings of signal dip positions (times) caused by the notches.

Figure 4C:
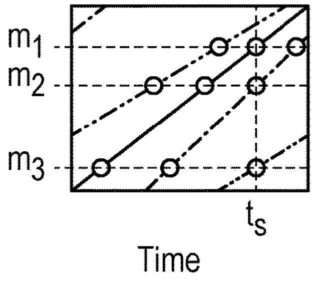

Additionally or alternatively, scanning/stepped notches may be arranged to be non-parallel with each other, for example by selecting different scan parameters (such as constants A, B, C and D in equation (1) above) for different notches. For example, FIG. 4C illustrates the effect of each notch scan being non-parallel with each other notch scan. In this case, scanning notches are arranged to converge and/or diverge over time during at least some of the encoding cycle.

Again, in this case, the set of mass to charge ratio positions of the notches at any one time during the encoding cycle is unique. For example, in the example of FIG. 4C, $t_s$ is the only time during the scan at which masses $m_1$, $m_2$ and $m_3$ experience attenuation at the same time. This results in the time spacings between signal dips caused by the notches varying with mass to charge ratio, and thus all mass to charge ratios within the scan range have unique encodings of signal dip positions (times) caused by the notches.

Additionally or alternatively, mass to charge ratio may be encoded into the ion signal using the widths of one or more of the signal dips caused by the notches, for example by appropriately varying the amplitude of one or more excitation voltage waveforms in time, for example continuously or discontinuously (as discussed above). Thus, ions that are transmitted by the quadrupole device 2 with the same or similar signal dip positions (times) caused by the notches may be distinguished from each on the basis of signal dip width(s).

Additionally or alternatively, mass to charge ratio may be encoded into the ion signal using the number of signal dips caused by the notches, for example by appropriately varying the number of notches that ions are subjected to in an encoding cycle as a function of mass to charge ratio.

As described herein, the mass to charge ratio of an ion may be encoded by attenuating that ion with a particular attenuation time profile, that is, such that the mass to charge ratio of the ion is encoded as a pattern of signal dips (attenuation) in the intensity time profile of the ion transmitted by the quadrupole device 2. The encoding can include differences in signal dip position (in time), and/or a differences signal dip width (in time) and/or differences in number of signal dips.

This then means that the mass to charge ratio of a precursor ion transmitted by the quadrupole device 2 can be determined from this pattern of signal dips. Moreover, where a precursor ion is fragmented or reacted to produce one or more fragment or product ions (by the fragmentation or reaction device 3), the attenuation pattern of the precursor ion will be apparent in the intensity time profile of the one or more fragment or product ions. This then means that the one or more fragment or product ions can be associated with a corresponding precursor ion using the pattern. In particular, a fragment or product ion can be determined to be associated with a precursor ion when the intensity time profile of the fragment or product ion includes substantially the same pattern of signal dips (attenuation caused by the notches) as the precursor ion.

The same encoding may be applied during each encoding cycle of the quadrupole device 2. Thus, for each instance of the first mode and each instance of the second mode, the quadrupole device 2 may be operated to encode the same set of attenuation time profiles during a respective encoding cycle. In other words, the notches may be scanned/stepped in the same manner during each encoding cycle, and during each of the first and second modes.

However, it is alternatively contemplated that the encoding may be varied in time, for example during an experimental run and/or between different experimental runs. Thus, different encoding may be applied for different encoding cycles during an experimental run and/or during different experimental runs. For example, a first encoding scanning/stepping pattern may be used for a first pair of first and second mode instances, and a second different scanning/stepping pattern may be used for a second different pair of first and second mode instances (during the same or different experimental runs). Varying the encoding in this manner can increase specificity.

The encoding could be varied in time in a predetermined sequence. For example, the encoding may be varied in time so as to improve the confidence with which different ions can be distinguished from each other.

Additionally or alternatively, the encoding may be varied in a data dependent manner. For example, the encoding may change in response to the detection of a particular ion or ions of interest.

Additionally or alternatively, the encoding may be selected based on the properties of the sample being analysed. For example, encoding complexity may be increased for more complex samples. Conversely, a less complex encoding may be used for a less complex sample.

Where plural different excitation voltage waveforms are applied to the quadrupole device 2, they may be applied to the same electrodes of the quadrupole device 2. However, different dipolar excitation voltage waveforms may be applied (simultaneously) to different opposing electrode pairs of a quadrupole 2. Thus, plural dipolar excitation waveforms may be applied (simultaneously) to the quadrupole device 2 by applying at least one of the dipolar excitation waveforms to one pair of opposing electrodes of the quadrupole device 2, and by applying at least one other dipolar excitation waveform to the other pair of opposing electrodes of the quadrupole device 2. Plural dipolar excitation waveforms may be split evenly between different opposing electrode pairs, for example such that the number of dipolar excitation waveforms applied to one opposing electrode pair is equal to the number of dipolar excitation waveforms applied to the other opposing electrode pair, or differs by only one.

Figure 5A:
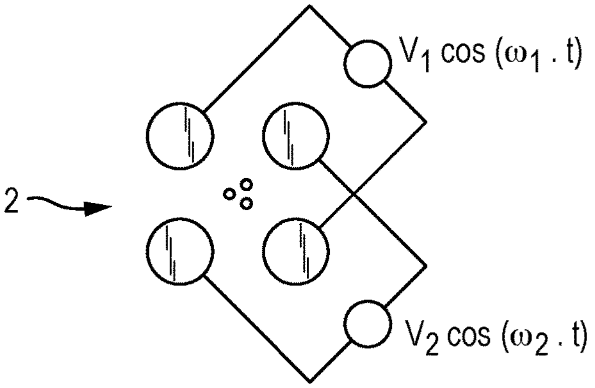
FIGS. 5A and 5B illustrate the application of excitation waveforms to a quadrupole device in accordance with various embodiments.

For example, FIG. 5 illustrates how the five dipolar excitation waveforms in the example of FIG. 3 were applied simultaneously to the quadrupole device 2. As shown in FIG. 5A, opposite phases of a first voltage waveform, $V_1$, were applied to opposite electrodes of one of the pairs of opposing electrodes, and opposite phases of a second voltage waveform, $V_2$, were applied to opposite electrodes of the other pair of opposing electrodes.

Figure 5B:
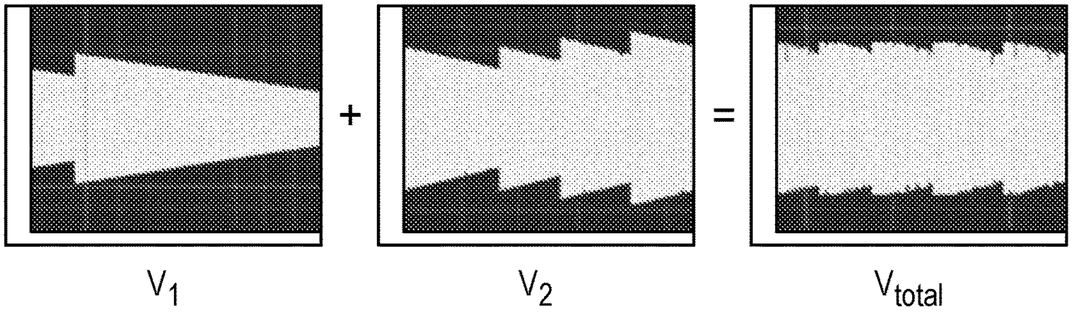

FIG. 5B illustrates the form of the different waveforms, $V_1$ and $V_2$, that were applied to the different opposing electrode pairs during each encoding cycle (lasting T=0.5 s). The first voltage waveform, $V_1$, comprises two of the five dipolar excitation waveforms, whereas the second voltage waveform, $V_2$, comprises the other three of the five dipolar excitation waveforms. Both waveforms $V_1$ and $V_2$ were applied with an amplitude that varied from about ±6V to about ±2V.

FIG. 5B also shows the form of the waveform, $V_{total}$, that would need to be applied to the quadrupole 2 if all of the five dipolar excitation waveforms were applied together to the same electrodes. In this case, a maximum amplitude of about ±10V is required to achieve the same degree of attenuation, due to increased constructive interference effects. Furthermore, a greater degree of destructive interference and consequent beating can be observed in waveform $V_{total}$, as compared to waveforms $V_1$ and $V_2$, which can cause a reduction in power.

Thus, the inventors have recognised that applying different dipolar excitation waveforms to different opposing electrode pairs in this manner can reduce the maximum voltage amplitude that is required to be applied to the electrodes, as compared to applying all dipolar excitation waveforms together to the same electrodes, due to a reduction in constructive interference effects. Moreover, power can be increased due to a reduction in destructive interference effects. This can simplify the electronics required to produce the waveforms, and so decrease expense.

Once the encoded mass spectral data has been acquired, the data is processed in order to associate ions. This data processing may be performed in any suitable manner, for example by a processor of the control system 14. In general, the mass spectral dataset may be processed in order to detect (for example, deconvolve) attenuation time profiles (signal dips) in the mass spectral data. Detected attenuation time profiles for precursor ions may then be compared with detected attenuation time profiles for fragment or product ions, and the comparison may be used to associate fragment or product ions with corresponding precursor ions. In particular, precursor ions and fragment or product ions may be determined to be related to each other (that is, associated with each other) when their detected attenuation time profiles are determined to be substantially the same.

The inventors have found, however, that this processing can present some challenges. For example, existing DIA algorithms are typically designed to associate precursors and fragments based on the presence, rather than the absence, of signal at a particular time. Therefore, the data processing may comprise transforming the raw mass spectral data into a form that can be processed by an existing DIA method. For example, a linear transformation may be performed, which may comprise subtracting attenuated mass spectral data from corresponding unattenuated data. This may result in a transformed dataset that includes ion signal, rather than signal dips, in data regions corresponding to attenuated regions of the original mass spectral dataset. This transformed data may then be processed according, for example, to an existing DIA data processing method.

Additionally or alternatively, the data processing may comprise a more direct approach to detect attenuation time profiles in the raw mass spectral data. For example, attenuation time profiles may be detected in the mass spectral data using a Bayesian approach that utilises a model of notch shape. Although this more direct approach may be more computationally intensive, it may be more powerful than the above subtractive method, especially for multi-notch experiments. Accordingly, specificity may be improved.

Additionally or alternatively, the data processing may comprise re-summing mass spectral data over the quadrupole dimension, and applying, for example, an existing DIA data processing method to the re-summed data. A resulting peak list may then be filtered using scanning notch information, which may result in relatively cleaner MS/MS data. This more targeted approach may be less computationally demanding than the above two methods.

The data processing may comprise at least one of: a) a linear deconvolution method, such as Tikhonov regularized least squares, truncated singular value decomposition or Wiener deconvolution; b) an iterative constrained least-squares approach, such as non-negative least squares, Richardson-Lucy deconvolution or modified residual norm steepest descent; and c) a Bayesian forward modelling approach, such as Maximum Entropy deconvolution, Markov Chain Monte Carlo or nested sampling.

The data processing may comprise Maximum Entropy deconvolution.

The mass spectral dataset may be smoothed or filtered in one or more dimensions, such as the RT dimension, prior to deconvolution, using a method such as a boxcar smooth, Savitzky-Golay filter or Wiener filter. This may reduce noise and improve specificity.

Deconvolution and/or peak detection in the RT dimension may be carried out prior to, simultaneously with, or following deconvolution of the mass spectral (MS) dimensions.

A model of the precursor encoding pattern to be used in deconvolution may be derived from experimental data. For example, data may be acquired using an appropriate sample and the corresponding quadrupole encoding pattern. For example, MS conditions may be optimised so as to maximise the m/z space that is populated by the sample, for example using in-source activation, and also to minimise the amount of post-quadrupole fragmentation. A notch pattern may be fitted to this data, or the data may be normalised and used directly in the deconvolution or following a smoothing or filtering step.

A mass spectral peak detection algorithm may be applied prior to deconvolution. The deconvolution may then be performed on the basis of the detected peaks. This may simplify the required processing.

The deconvolution may be applied to a restricted subset of the data, for example corresponding to a target mass list or to masses identified in a peak detection step. This may reduce the required processing.

The mass spectral data may be normalised in order to reduce or remove the effects of the attenuation encoding in the data. For example, in various embodiments, ion intensities in the mass spectral data are multiplied by a correction factor determined from a mass to charge ratio dependent correction function, F(m/z). Where different scan parameters are used, for example during an experiment or for different experiments, different correction functions may be used for different scan parameters, such that the effects of differing encoding patterns can be accounted for.

Multiplication of intensity values by a factor determined using the correction function may produce corrected intensity (ion current) values that correspond to an estimate of the ion intensity that would be observed in the absence of any attenuating excitation voltage waveforms, or using a different set of scan parameters. The correction may be applied to the dataset before or after a summing step. The correction function F(m/z) may be constant or unity for some sets of scan parameters or for some mass to charge ratio regions.

Correcting ion intensities in this manner may be particularly useful where data acquired from different scans are summed together into a single spectrum, for example prior to a processing step. For example, correcting intensity values in this manner may be useful in a quantitative experiment in which the observed ion current is used to determine an absolute or relative amount of a compound; in an experiment in which absolute or relative ion current is used to trigger an event (such as an MS\MS experiment) or to control an instrument parameter (for example a trap fill time or a DRE lens setting); and to facilitate data processing (for example, chromatographic peak detection).

FIGS. 6A-6E show an example in which a sample comprising a Tryptic digest of *E. coli* was separated according to chromatographic retention time (RT) using reverse-phase micro flow liquid chromatography (LC). The retention time separated sample was ionised, and the resulting ions were passed into the quadrupole device 2. The quadrupole device 2 and collision cell 3 were operated substantially as discussed above with respect to the example of FIG. 3. Thus, the same encoding was applied by the quadrupole device 2 for each low energy (non-fragmenting) mode of the collision cell 3, and for each high energy (fragmenting) mode of the collision cell 3.

Figure 6:
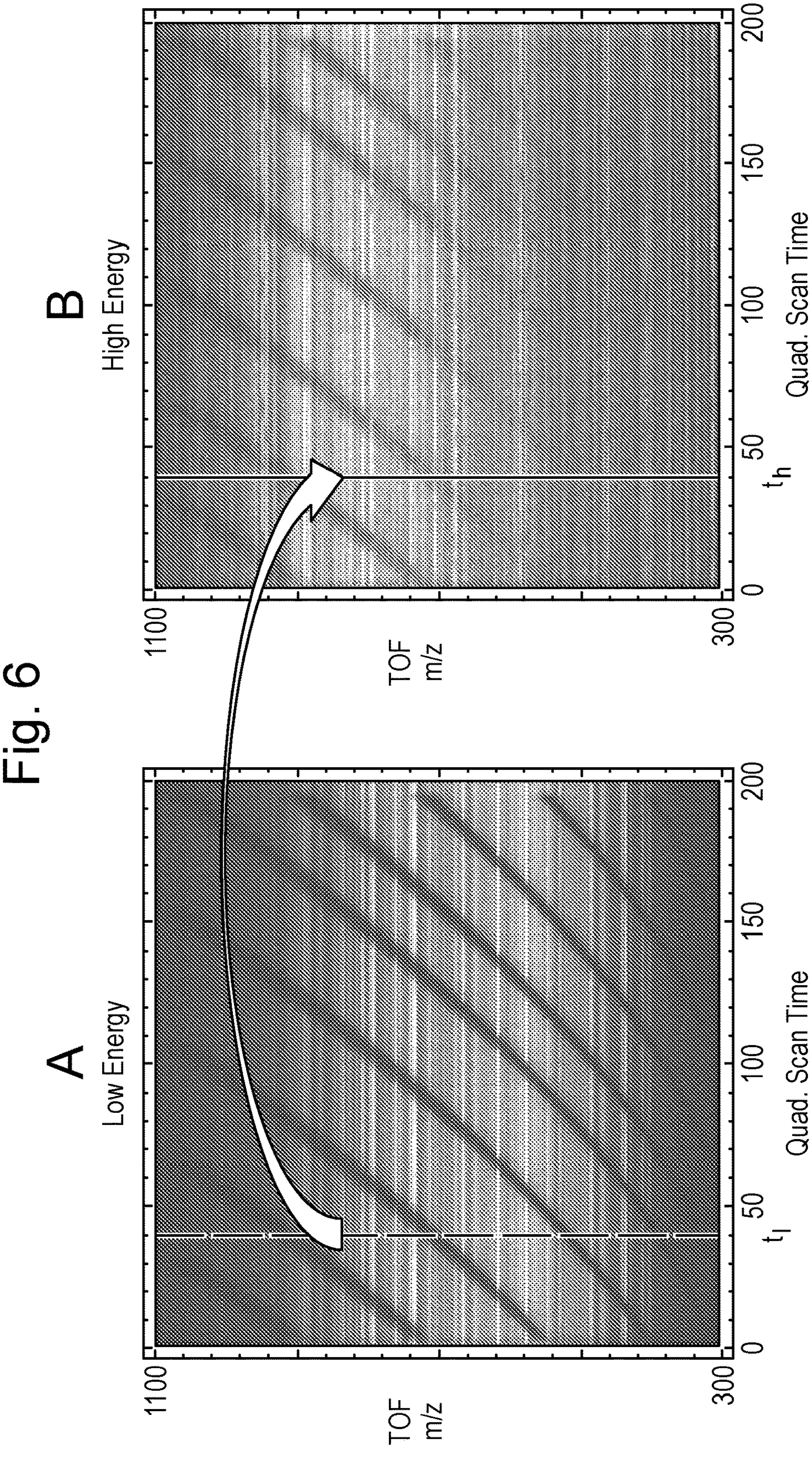
FIGS. 6A, 6B, 6C, 6D and 6E each show a plot of data obtained by analysing a sample in accordance with an embodiment.

FIG. 6A shows the resulting precursor ion dataset formed by summing data from each instance of the low energy (non-fragmenting) mode of the collision cell 3, and FIG. 6B shows the corresponding fragment ion dataset formed by summing data from each corresponding instance of the high energy (fragmenting) mode of the collision cell 3. In these plots, as in FIG. 3B, the x-axis corresponds to the number in the sequence of acquired spectra (that is, corresponding to time), and the y-axis corresponds to mass to charge ratio detected by the ToF mass analyser 4. The intensity of ions detected (ion current) is indicated by shading, with darker shading indicating a lower detected ion intensity, and brighter shading indicating a higher detected ion intensity.

As in the example of FIG. 3B, in the present example, dark bands are apparent in the precursor ion data of FIG. 6A that extend diagonally upwards and to the right. As described above, these dark bands represent the attenuation caused by five scanned notches. The same pattern of dark bands is also detectable in the fragment ion data of FIG. 6B, due to the same pattern of five scanned notches having been applied upstream of the collision cell 3.

Thus, at any given time during the encoding cycle (lasting T=0.5 s), notches can be detected at the same mass to charge ratio positions for both the precursor and fragment ion datasets. For example, as illustrated in FIGS. 6A and 6B, at time $t_1$ in the precursor ion dataset five dips in ion signal are present, and at corresponding time to in the fragment ion dataset five dips in ion signal are present at the same mass to charge ratios. However, the notch pattern is less apparent in the high energy dataset of FIG. 6B due to signal from fragments that have mass to charge ratios that lie within the mass to charge ratio scanning range of the notches whose precursors have mass to charge ratios which lie outside of the mass to charge ratio scanning range of the notches.

Figure 6C:
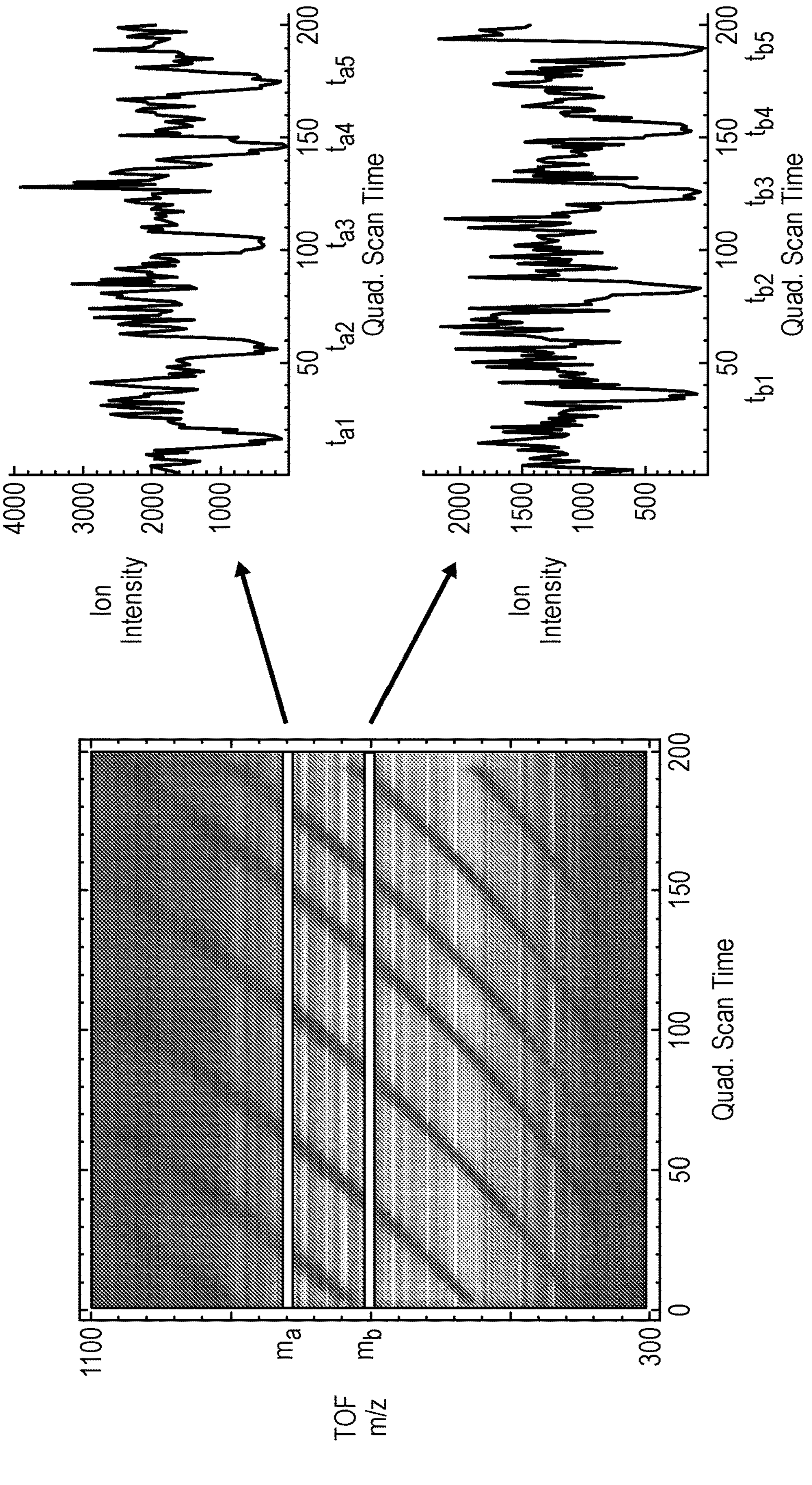

FIG. 6C shows the same data as FIG. 6A, but illustrates how this arrangement results in ions having different mass to charge ratios being attenuated with different attenuation time profiles. As can be seen in FIG. 6A, ions having mass to charge ratio $m_a$ are attenuated with a first attenuation time profile such that the transmission profile of ions having mass to charge ratio $m_a$ includes five signal dips at times $t_{a1}$-$t_{a5}$. Ions having mass to charge ratio $m_b$, however, are attenuated with a second different attenuation time profile such that the transmission profile of ions having mass to charge ratio $m_b$ includes five signal dips at a different set of times, $t_{b1}$-$t_{b5}$. This then means that the attenuation time profile of a fragment ion in the dataset of FIG. 6B encodes the mass to charge ratio of its precursor ion. The fragment ion can therefore be associated with a precursor ion detected in the dataset of FIG. 6A on the basis of their attenuation time profiles matching. When a high energy m/z range can be populated by more than one precursor (for example two parent ions that produce the same fragment ion), the resulting time profile will be a weighted combination of the corresponding precursor time profiles. This combined profile may be deconvolved to produce a precursor spectrum (or list of precursor ion m/z values) for a high energy m/z range.

Figure 6D:
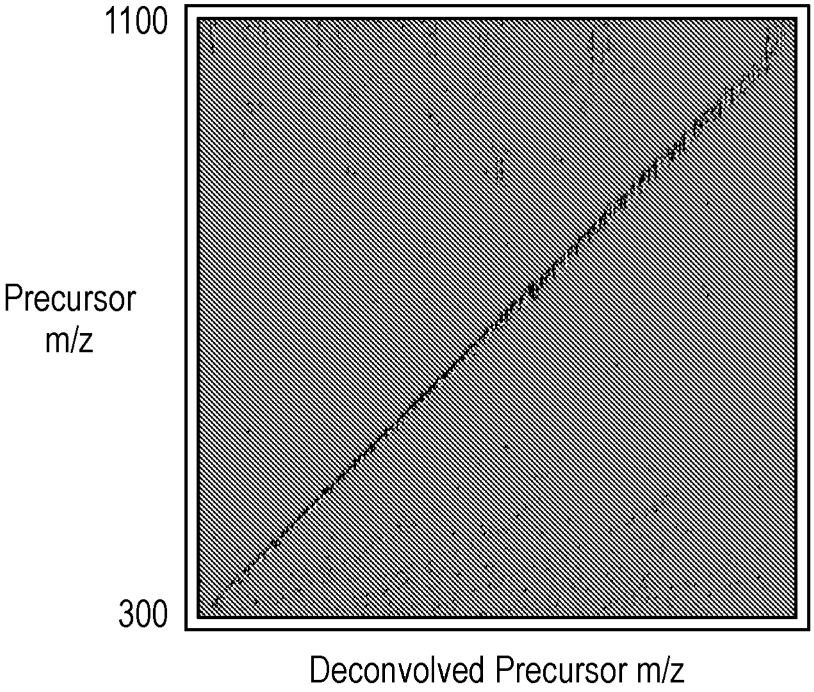
Figure 6E:
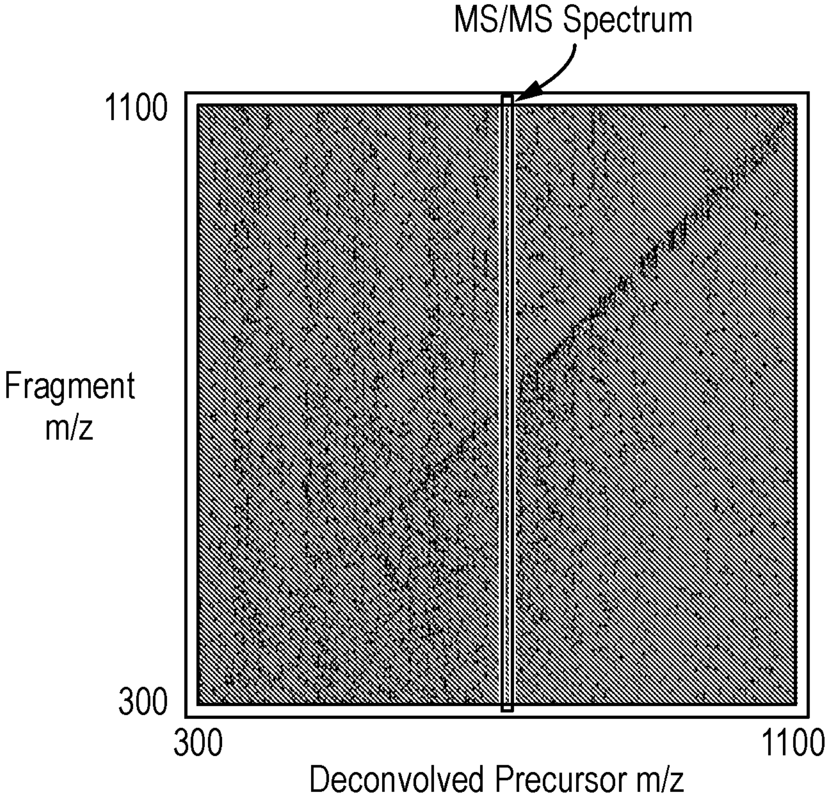

FIGS. 6D and 6E show examples of a deconvolution operation. In these examples, a model of the precursor encoding pattern was derived from experimental data and used in the deconvolution, as discussed above.

FIG. 6D shows the results of the deconvolution operation applied to the precursor ion data of FIG. 6A, and FIG. 6E shows the results of the deconvolution operation applied to the fragment ion data of FIG. 6B. FIG. 6D confirms that the mass to charge ratio of a precursor ion can be reconstructed from its attenuation time profile, and FIG. 6E confirms that the attenuation time profile of a fragment ion can be used to determine the mass to charge ratio of its precursor ion.

Although in the above embodiments, the quadrupole device 2 is operated in an "AC-only" mode of operation, it is contemplated that a resolving DC voltage may be applied to the quadrupole device 2 by the one or more voltage sources 12 (simultaneously with the main AC quadrupolar and one or more AC excitation voltage waveforms). The resolving DC may act as a "band pass filter", and thus restrict the transmission window of the quadrupole device 2 to a (relatively more narrow) mass to charge ratio range of interest.

For example, in various embodiments, a resolving DC voltage is applied to the quadrupole device 2 simultaneously with one or more scanning AC excitation voltage waveforms such that substantially only ions within the scan range of the one or more scanning AC excitation voltage waveforms can be transmitted by the quadrupole device 2 (and other ions outside of the scan range are attenuated due to the applied DC voltage). This then means that the quadrupole 2 will transmit substantially only those ions that have been encoded by the applied scanning AC excitation voltage waveforms.

This can reduce the complexity of resulting mass spectral dataset and the associated processing requirements. For example, the signals from unencoded ions may be reduced or removed, such that interference with other (encoded) ion signals can be reduced. Moreover, the total amount of data that is required to be stored may be reduced. This may be particularly beneficial in the case of fragment or precursor ion data, since this data may often include plural overlapping signals.

The presence of unencoded ion signals in the mass spectral data (for example, those arising from precursor ions having mass to charge ratios outside of the scan range) may be accounted for in a deconvolution by assigning a "background" channel having a flat time response. This can simplify the processing required to take account of any such ion signals, and can reduce or eliminate artefacts in the deconvolved data.

The inventors have recognised that the amount of mass spectral data obtained using a method described herein can be considerably larger than other methods, since for example, in methods described herein the signal from a single ion species can be effectively spread throughout most or all of the acquisition time. The acquired mass spectral data may therefore be compressed. For example, the compression may comprise differentiating the mass spectral data in the mass to charge ratio dimension, for example subtracting consecutive mass spectra from each other, and then storing the difference data. A further compression technique may then be applied to the difference data. The inventors have recognised that in methods described herein, consecutive mass spectra acquired may be likely to be similar to each other, and thus that storing difference data, rather than raw mass spectral data, can reduce storage requirements, and improve data transfer rates over bandwidth limited connections.

It is contemplated that the fragmenting or reacting conditions of the fragmentation or reaction device described herein may be maintained substantially constant during each mode instance (and encoding cycle). For example, the collision energy of the collision cell 3 may be maintained constant during each encoding cycle, rather than for example ramping collision energy. This may ensure that signals in the mass spectral data can be attributed to the time variation in the one or more AC excitation waveforms, and thus simplify processing requirements. To acquire data for a range of different collision energies, different collision energies may be used for different encoding cycles. The resulting mass spectral data may then be processed by deconvolving data for different collision energies separately, or by compressing the data by summing over collision energies prior to processing.

Although in the above embodiments, ions have only been described as being associated with each other on the basis of the detected attenuation time profiles (signal dips), it is contemplated that the ions may also be associated with each other on the basis of their chromatographic elution profiles. For example, ions may be initially associated with each on the basis of their chromatographic elution profiles, for example according to an MSE method. The attenuation time profile data may then be used to improve the ion assignments and reduce ambiguity.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:

applying a first AC voltage waveform to electrodes of an ion guide so as to radially confine ions within the ion guide;

simultaneously applying two or more AC excitation voltage waveforms to electrodes of the ion guide, wherein each of the two or more AC excitation voltage waveforms is configured to radially excite and thereby attenuate ions having a mass to charge ratio within a respective mass to charge ratio window as those ions pass through the ion guide;

varying the two or more AC excitation voltage waveforms with time as the ions pass through the ion guide such that ions of each mass to charge ratio within a mass to charge ratio range are encoded with a unique attenuation time profile; and detecting an encoded attenuation time profile in a precursor ion or fragment ion signal;

wherein said varying the two or more AC excitation voltage waveforms with time comprises varying both the frequency and amplitude of at least one of the two or more AC excitation waveforms with time; and wherein said varying both the frequency and amplitude of at least one of the two or more AC excitation waveforms with time comprises varying the at least one AC excitation voltage waveform substantially according to an expression, wherein the expression includes:

a term configured to cause the respective mass to charge ratio window to scan continuously or discontinuously across a mass to charge ratio range according to an approximately linear relationship between mass to charge ratio and time; and a term configured to cause a width of the respective mass to charge ratio window to remain approximately constant as the respective mass to charge ratio window scans continuously or discontinuously across the mass to charge ratio range.

2. The method of claim 1, comprising periodically varying each of the two or more AC excitation voltage waveforms with a time period T such that during each time period T the corresponding mass to charge ratio windows each scan continuously or discontinuously across the same mass to charge ratio range.

3. The method of claim 1, comprising varying the two or more AC excitation voltage waveforms with time such that ions are encoded with a first set of attenuation time profiles during a first time period $T_1$, and ions are encoded with a second different set of attenuation time profiles during a second different time period $T_2$.

4. The method of claim 1, wherein the ion guide is a multipole ion guide and the method comprises applying the two or more AC excitation voltage waveforms to electrodes of the ion guide by applying at least one AC dipolar excitation waveform to one pair of opposing electrodes of the ion guide, and simultaneously applying at least one other AC dipolar excitation waveform to another pair of opposing electrodes of the ion guide.

5. The method of claim 1, comprising varying the two or more AC excitation voltage waveforms with time such that each of the corresponding mass to charge ratio windows varies within a mass to charge ratio range; and applying a DC voltage to electrodes of the ion guide, wherein the DC voltage is such that all ions outside of the mass to charge ratio range are attenuated by the ion guide.

6. The method of claim 1, wherein the two or more AC excitation voltage waveforms are configured to encode ions having mass to charge ratios within a mass to charge ratio range by attenuating 40% to 60%, 45% to 55%, or approximately 50% of the mass to charge ratio range at any one time.

7. The method of claim 1, further comprising:

performing a first mode of operation comprising fragmenting or reacting precursor ions transmitted by the ion guide to form fragment or product ions, and mass analysing the fragment or product ions to produce first mass spectral data;

performing a second mode of operation comprising mass analysing precursor ions transmitted by the ion guide to produce second mass spectral data; and processing the first and second mass spectral data to detect attenuation time profiles in the first and second mass spectral data, and to associate fragment or products ions in the first mass spectral data with precursor ions in the second mass spectral data based on their detected attenuation time profiles matching.

8. The method of claim 7, comprising separating ions, or separating analyte and then ionising the analyte to provide separated ions, and then passing the separated ions into the ion guide;

wherein processing the first and second mass spectral data comprises associating fragment or products ions in the first mass spectral data with precursor ions in the second mass spectral data based on the detected attenuation time profiles and the times of detection of the ions.

9. The method of claim 7, wherein processing the first and second mass spectral data comprises at least one of: a) using a deconvolution method; b) using an iterative least-squares method; c) using a forward modelling method; d) transforming data to produce transformed data, and processing the transformed data; e) smoothing and/or filtering data to produce smoothed and/or filtered data, and processing the smoothed and/or filtered data; f) detecting peaks in the first and/or second mass spectral data; g) processing data corresponding to only a subset of the first and/or second mass spectral data; and h) normalising data.

10. The method of claim 1, comprising encoding ions with unique attenuation time profiles by periodically varying each of the two or more AC excitation voltage waveforms with a time period T as the ions pass through the ion guide such that the set of mass to charge ratio positions of the corresponding mass to charge ratio windows at any one time during the time period T is different to the set of mass to charge ratio positions of the mass to charge ratio windows at any other time during the time period T.

11. The method of claim 1, comprising encoding ions with unique attenuation time profiles by periodically varying each of the two or more AC excitation voltage waveforms with a time period T such that the set of times that an ion having a first mass to charge ratio within the mass to charge ratio range experiences attenuation due to the two or more AC excitation voltage waveforms during the time period T is different to the set of times that ions having other mass to charge ratios within the mass to charge ratio range experience attenuation due to the two or more AC excitation voltage waveforms during the time period T.

12. The method of claim 1, comprising encoding ions with unique attenuation time profiles by:

periodically varying each of the two or more AC excitation voltage waveforms with a time period T such that during each time period T the corresponding mass to charge ratio windows each scan across the mass to charge ratio range; and causing a difference in mass to charge ratio between different windows to vary during said time period T and/or causing an offset between each pair of adjacent windows to be different.

13. A mass spectrometer comprising:

an ion guide;

at least one voltage supply configured to apply a first AC voltage waveform to electrodes of the ion guide so as to radially confine ions within the ion guide, and to simultaneously apply two or more AC excitation voltage waveforms to electrodes of the ion guide, wherein each of the two or more AC excitation voltage waveforms is configured to radially excite and thereby attenuate ions having a mass to charge ratio within a respective mass to charge ratio window as those ions pass through the ion guide; and a control circuit configured to:

vary the two or more AC excitation voltage waveforms with time as ions pass through the ion guide such that ions of each mass to charge ratio within a mass to charge ratio range are encoded with a unique attenuation time profile; and detect an encoded attenuation time profile in a precursor ion or fragment ion signal;

wherein the control circuit is configured to vary the two or more AC excitation voltage waveforms with time by varying both the frequency and amplitude of at least one of the two or more AC excitation waveforms with time; and wherein said varying both the frequency and amplitude of at least one of the two or more AC excitation waveforms with time comprises varying the at least one AC excitation voltage waveform substantially according to an expression, wherein the expression includes:

a term configured to cause the respective mass to charge ratio window to scan continuously or discontinuously across a mass to charge ratio range according to an approximately linear relationship between mass to charge ratio and time; and a term configured to cause a width of the respective mass to charge ratio window to remain approximately constant as the respective mass to charge ratio window scans continuously or discontinuously across the mass to charge ratio range.

14. The mass spectrometer of claim 13, wherein the control circuit is configured to periodically vary each of the two or more AC excitation voltage waveforms with a time period T such that during each time period T the corresponding mass to charge ratio windows each scan continuously or discontinuously across the same mass to charge ratio range.

15. The mass spectrometer of claim 13, wherein the ion guide is a multipole ion guide and the at least one voltage supply is configured to apply the two or more AC excitation voltage waveforms to electrodes of the ion guide by applying at least one AC dipolar excitation waveform to one pair of opposing electrodes of the ion guide, and simultaneously applying at least one other AC dipolar excitation waveform to another pair of opposing electrodes of the ion guide.

16. The mass spectrometer of claim 13, wherein the control circuit is configured to vary the two or more AC excitation voltage waveforms with time such that each of the corresponding mass to charge ratio windows varies within a mass to charge ratio range; and wherein the at least one voltage supply is configured to apply a DC voltage to electrodes of the ion guide, wherein the DC voltage is such that all ions outside of the mass to charge ratio range are attenuated by the ion guide.

17. The mass spectrometer of claim 13, further comprising:

a fragmentation or reaction device downstream of the ion guide;

a mass analyser downstream of the fragmentation or reaction device; and at least one processor;

wherein the fragmentation or reaction device is configured to perform a first mode of operation in which precursor ions are fragmented or reacted and resulting fragment or product ions are onwardly transmitted to the mass analyser, and to perform a second mode of operation in which precursor ions are onwardly transmitted to the mass analyser;

wherein the mass analyser is configured to mass analyse ions to acquire mass spectral data; and wherein the at least one processor is configured process mass spectral data acquired by the mass analyser to detect attenuation time profiles, and to associate fragment or products ions with precursor ions based on the detected attenuation time profiles.

18. A mass spectrometer comprising:

an ion guide;

at least one voltage supply configured to apply a first AC voltage waveform to electrodes of the ion guide so as to radially confine ions within the ion guide, and to apply one or more AC excitation voltage waveforms to electrodes of the ion guide, wherein each of the one or more AC excitation voltage waveforms is configured to radially excite and thereby attenuate ions having a mass to charge ratio within a respective mass to charge ratio window as those ions pass through the ion guide; and a control circuit configured to vary the one or more AC excitation voltage waveforms with time as ions pass through the ion guide such that ions having different mass to charge ratios are attenuated with different attenuation time profiles;

wherein the control circuit is configured to vary the one or more AC excitation voltage waveforms with time by varying both the frequency and amplitude of at least one of the one or more AC excitation waveforms with time; and wherein said varying both the frequency and amplitude of at least one of the one or more AC excitation waveforms with time comprises varying the at least one AC excitation voltage waveform substantially according to an expression, wherein the expression includes:

a term configured to cause the respective mass to charge ratio window to scan continuously or discontinuously across a mass to charge ratio range according to an approximately linear relationship between mass to charge ratio and time; and a term configured to cause a width of the respective mass to charge ratio window to remain approximately constant as the respective mass to charge ratio window scans continuously or discontinuously across the mass to charge ratio range.

* * * * *